United States Patent
Ryu et al.

(10) Patent No.: US 7,960,903 B2
(45) Date of Patent: Jun. 14, 2011

(54) ELECTRON EMISSION SOURCE, ITS METHOD OF FABRICATION, AND AN ELECTRON EMISSION DEVICE USING THE ELECTRON EMISSION SOURCE

(75) Inventors: Mee-Ae Ryu, Suwon-si (KR); Jong-Hwan Park, Suwon-si (KR); Jae-Sang Ha, Suwon-si (KR); Jeong-Hee Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1129 days.

(21) Appl. No.: 11/362,210

(22) Filed: Feb. 27, 2006

(65) Prior Publication Data

US 2006/0197429 A1    Sep. 7, 2006

(30) Foreign Application Priority Data

Mar. 2, 2005  (KR) .................. 10-2005-0017180

(51) Int. Cl.
 *H01J 1/00* (2006.01)
(52) U.S. Cl. ........................ 313/311; 313/310
(58) Field of Classification Search .............. 445/50, 445/51; 427/76; 977/163, 79; 313/311, 313/310, 309, 346 R, 495
See application file for complete search history.

(56) References Cited

U.S. PATENT DOCUMENTS

| 5,516,733 | A * | 5/1996 | Morena .......................... 501/15 |
| 6,409,567 | B1 * | 6/2002 | Amey et al. .................... 445/50 |
| 6,565,403 | B1 * | 5/2003 | Amey et al. .................... 445/51 |
| 2003/0141798 | A1 * | 7/2003 | Jin et al. ....................... 313/310 |
| 2003/0173884 | A1 | 9/2003 | Heo et al. |
| 2003/0222560 | A1 | 12/2003 | Roach |
| 2004/0150312 | A1 * | 8/2004 | McElrath et al. ............. 313/310 |
| 2004/0178713 | A1 | 9/2004 | Na et al. |
| 2004/0256975 | A1 * | 12/2004 | Gao et al. ..................... 313/495 |
| 2005/0001528 | A1 | 1/2005 | Mao et al. |
| 2005/0090176 | A1 * | 4/2005 | Dean et al. ..................... 445/51 |
| 2006/0082278 | A1 * | 4/2006 | Lee et al. ...................... 313/311 |
| 2006/0255297 | A1 * | 11/2006 | Moon et al. ................ 250/493.1 |

FOREIGN PATENT DOCUMENTS

DE        10101169        12/2001

(Continued)

OTHER PUBLICATIONS

Japanese Office Action from Japanese Patent Office issued in Applicant's corresponding Japanese Patent Application No. 2006-037160 dated Dec. 9, 2008.
The examination report dated Jul. 28, 2008 by European Patent Office for App. No. 06110540.9-2208.

(Continued)

*Primary Examiner* — Peter Macchiarolo
(74) *Attorney, Agent, or Firm* — Robert E. Bushnell, Esq.

(57) ABSTRACT

An electron emission source-forming composition includes a carbon-based material; a vehicle composed of a resin component and a solvent component; and at least one metal oxide with an average particle diameter in a range of 100 to 1,000 nm selected from $Al_2O_3$, $TiO_2$, and $SiO_2$. The electron emission source-forming composition is sintered under an air atmosphere during electron emission source formation. Therefore, carbon deposits after sintering and degradation of Carbon Nano-Tubes (CNTs) upon sintering can be remarkably reduced. As a result, the electron emission source formed using the composition has a high current density and the electron emission device using the electron emission source exhibits enhanced reliability.

15 Claims, 4 Drawing Sheets

FOREIGN PATENT DOCUMENTS

| | | | |
|---|---|---|---|
| JP | 2000-044253 | | 2/2000 |
| JP | 2000-204304 | | 7/2000 |
| JP | 2001-019473 | | 1/2001 |
| JP | 2002-093305 | | 3/2002 |
| JP | 2003-506843 | | 2/2003 |
| JP | 2004-311407 | | 11/2004 |
| JP | 2005-025970 | | 1/2005 |
| JP | 2006164965 A | * | 6/2006 |
| KR | 20030069450 A | | 8/2003 |
| WO | WO 02/051765 | | 7/2002 |
| WO | 2004/034417 | | 4/2004 |

OTHER PUBLICATIONS

European Search Report for European Patent Application No. 06110540.9 issued on Sep. 6, 2006.

Japanese Office Action issued by the Japanese Patent Office on Sep. 1, 2009, corresponding to the Japanese Patent Application No. 2006-037160.

Korean Office action issued by KIPO, dated Apr. 18, 2011, corresponding to Korean Patent Application No. 10-2005-0017180, together with Request for Entry.

* cited by examiner

ELECTRON EMISSION SOURCE, ITS METHOD OF FABRICATION, AND AN ELECTRON EMISSION DEVICE USING THE ELECTRON EMISSION SOURCE

CLAIM OF PRIORITY

This application makes reference to, incorporates the same herein, and claims all benefits accruing under 35 U.S.C. §119 from an application for AN ELECTRON EMISSION SOURCE, A PREPARING METHOD THEREOF, AND AN ELECTRON EMISSION DEVICE USING THE SAME earlier filled in the Korean Intellectual Property Office on 2 Mar. 2005 and there duly assigned Serial No. 10-2005-0017180.

BACKGROUND OF THE INVENTION

1. Field of the Invention

The present invention relates to an electron emission source, its method of fabrication, and an electron emission device using the electron emission source. More particularly, the present invention relates to an electron emission source having reduced a carbon-based material degradation during sintering, its method of fabrication, and an electron emission device using the electron emission source.

2. Description of the Related Art

Electron emission devices are displays that create images by emitting light by collision of phosphors in a phosphor layer of an anode plate with electrons emitted from electron emission sources of a cathode under an electric field generated when a voltage is supplied to the anode and the cathode.

Carbon-based materials, including Carbon Nano-Tubes (CNTs) with good electron conductivity, have advantages such as good conductivity and field enhancement effect, a low work function, a good field emission property, a low driving voltage, and device fabrication over a large area. Therefore, carbon-based materials are expected to be ideal electron emission sources for electron emission devices.

CNT-based electron emission sources can be fabricated by growth of CNTs on a substrate using, for example, Chemical Vapor Deposition (CVD) or a paste method using a CNT-containing, electron emission source-forming composition. With respect to the paste method, there is an advantage in that electron emission sources can be fabricated over a large area at a low cost. For example, a CNT-containing, electron emission source-forming composition is discussed in U.S. Pat. No. 6,436,221.

A conventional electron emission source fabrication method using a carbon-based material involves sintering a composition for forming electron emission sources. The sintering process is performed under an inert gas atmosphere to prevent electron emission degradation due to thermal decomposition of a carbon-based material such as CNTs.

However, sintering under an inert gas atmosphere cannot ensure a sufficient removal of organic materials, etc. used for fabricating the electron emission sources, leading to degradation in electron emission capability. In particular, when a lead-containing frit component is used in the fabrication of electron emission sources, thermal decomposition of CNTs occur. As a result, as an electron emission device fabrication process proceeds, electron emission degradation can worsen.

SUMMARY OF THE INVENTION

The present invention provides an electron emission source-fabrication composition which is sintered in an air atmosphere and which reduces degradation of a carbon-based material, such as Carbon Nano-Tubes (CNTs), during sintering, an electron emission source using the composition, a method of fabricating the electron emission source, and an electron emission device which is enhanced in reliability by using the electron emission source.

According to one aspect of the present invention, an electron emission source is provided comprising: a carbon-based material; and at least one metal oxide with an average particle diameter in a range of from 100 to 1,000 nm selected from $Al_2O_3$, $TiO_2$, and $SiO_2$. The content of the metal oxide is in a range of from 5 to 100 parts by weight based on 1 part by weight of the carbon-based material.

The electron emission source preferably further comprises a lead (Pb) free frit in a range of from 0.25 to 10 parts by weight based on 1 part by weight of the carbon-based material. The Pb free frit is preferably tin oxide-phosphorus pentaoxide (SnO—$P_2O5$).

According to another aspect of the present invention, an electron emission source is provided comprising: a carbon-based material; and a Pb free frit. The Pb free frit is SnO—$P_2O_5$. The content of the Pb free frit is preferably in a range of from 0.25 to 10 parts by weight based on 1 part by weight of the carbon-based material.

According to still another aspect of the present invention, an electron emission source is provided comprising: a first substrate and a second substrate disposed to face with each other; a cathode formed on the first substrate; an electron emission source, including a carbon-based material and at least one metal oxide with an average particle diameter in a range of from 100 to 1,000 nm selected from $Al_2O_3$, $TiO_2$, and $SiO_2$, electrically connected to the cathode formed on the first substrate; an anode formed on the second substrate; and a phosphor layer emitting light by electrons emitted from the electron emission source.

According to another aspect of the present invention, an electron emission source is provided comprising: a first substrate and a second substrate disposed to face with each other; a cathode formed on the first substrate; an electron emission source, including a carbon-based material and at least one metal oxide with an average particle diameter in a range of from 100 to 1,000 nm selected from $Al_2O_3$, $TiO_2$, and $SiO_2$ and wherein the content of the metal oxide is in a range of from 5 to 100 parts by weight based on 1 part by weight of the carbon-based material, electrically connected to the cathode formed on the first substrate; an anode formed on the second substrate; and a phosphor layer emitting light by electrons emitted from the electron emission source.

According to another aspect of the present invention, an electron emission source is provided comprising: a first substrate and a second substrate disposed to face with each other; a cathode formed on the first substrate; an electron emission source, including a carbon-based material and a Pb free frit, electrically connected to the cathode formed on the first substrate; an anode formed on the second substrate; and a phosphor layer emitting light by electrons emitted from the electron emission source.

According to another aspect of the present invention, an electron emission source is provided comprising: a first substrate and a second substrate disposed to face with each other; a cathode formed on the first substrate; an electron emission source, including a carbon-based material and a Pb free frit, wherein the content of the Pb free frit is in a range of from 0.25 to 10 parts by weight based on 1 part by weight of the carbon-based material, electrically connected to the cathode formed on the first substrate; an anode formed on the second substrate; and a phosphor layer emitting light by electrons emitted from the electron emission source.

According to another aspect of the present invention, an electron emission source-forming composition is provided comprising: a carbon-based material; a vehicle composed of a resin component and a solvent component; and at least one metal oxide with an average particle diameter in a range of from 100 to 1,000 nm selected from $Al_2O_3$, $TiO_2$, and $SiO_2$. The content of the metal oxide is preferably in a range of from 5 to 100 parts by weight based on 1 part by weight of the carbon-based material. The particle diameter of the metal oxide is preferably adjusted so that a difference between a particle diameter (D10) with 10 wt % particle-size distribution and a particle diameter (D90) with 90% particle-size distribution is 300 nm or less.

The composition preferably further comprises a Pb free frit in a range of from 0.25 to 10 parts by weight based on 1 part by weight of the carbon-based material. The Pb free frit is preferably $SnO$—$P_2O_5$.

According to another aspect of the present invention, an electron emission source-forming composition is provided comprising: a carbon-based material; a vehicle composed of a resin component and a solvent component; and a Pb free frit. The Pb free frit is preferably $SnO$—$P_2O_5$. The content of the Pb free frit is preferably in a range of from 0.25 to 10 parts by weight based on 1 part by weight of the carbon-based material.

According to another aspect of the present invention, a method of forming an electron emission source is provided, the method comprising: preparing the electron emission source-forming composition including: a carbon-based material; a vehicle composed of a resin component and a solvent component; and at least one metal oxide with an average particle diameter in a range of from 100 to 1,000 nm selected from $Al_2O_3$, $TiO_2$, and $SiO_2$; printing the electron emission source-forming composition on a substrate; and sintering the printed composition under an oxygen gas atmosphere or an atmosphere containing a mixed gas of oxygen and nitrogen.

According to another aspect of the present invention, a method of forming an electron emission source is provided, the method comprising: preparing the electron emission source-forming composition including: a carbon-based material; a vehicle composed of a resin component and a solvent component; and a Pb free frit; printing the electron emission source-forming composition on a substrate; and sintering the printed composition under an oxygen gas atmosphere or an atmosphere containing a mixed gas of oxygen and nitrogen.

The electron emission source-forming composition preferably further comprises at least one component selected from a photoresist resin, a photoinitiator, and a filler; and printing the electron emission source-forming composition preferably comprises: coating the substrate with the electron emission source-forming composition; and exposing and developing according to electron emission source areas of the substrate.

Sintering the printed composition is preferably performed at a temperature in a range of from 350 to 500° C.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
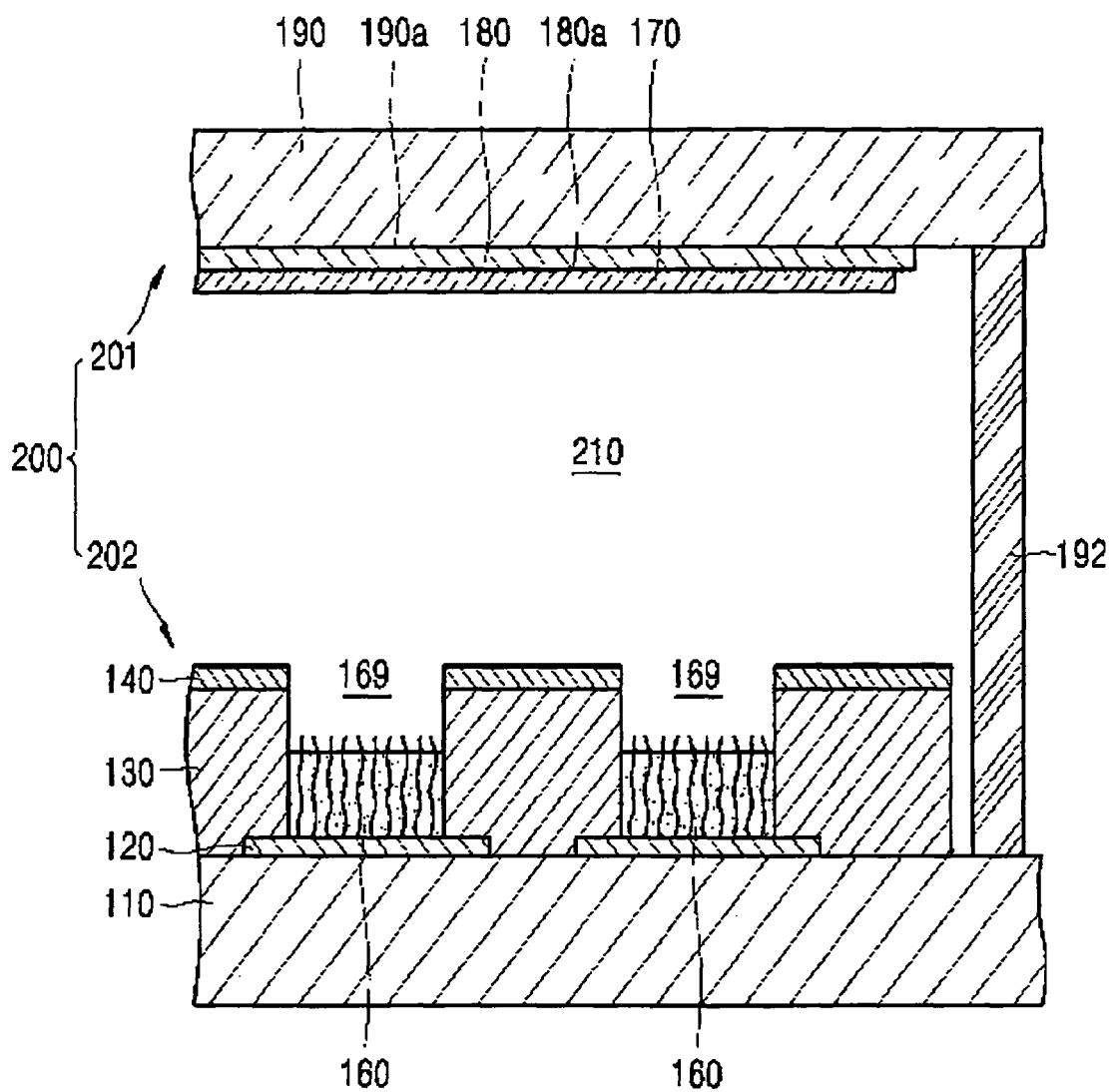
FIG. 1 is a schematic sectional view of an electron emission device according to an embodiment of the present invention.

The present invention are described more fully below with reference to the accompanying drawings, in which exemplary embodiments of the present invention are shown.

The present invention provides an electron emission source-forming composition including a carbon-based material, a vehicle, and at least one metal oxide with an average particle diameter of from 100 to 1,000 nm selected from $Al_2O_3$, $TiO_2$, and $SiO_2$. The electron emission source-forming composition can further include a lead (Pb) free frit. The Pb free frit can be tin oxide-phosphorus pentaoxide (SnO—$P_2O5$), but is not limited thereto.

As described above, it is preferable that the metal oxide used herein has an average particle diameter of from 100 to 1,000 nm. If the average particle diameter of the metal oxide is less than 100 nm, the dispersion of metal oxide particles is difficult. On the other hand, if it exceeds 1,000 nm, electron emission and hole injection is difficult.

The metal oxide has a difference of 300 nm or less, in particular, from 10 to 300 nm, between a particle diameter under which 10% by weight of the particles are to be found (D10) and a particle diameter under which 90% by weight of the particles are to be found (D90). If the difference between D10 and D90 exceeds 300 nm, an arc discharge in field emission can be induced.

Preferably, the average particle diameter of the metal oxide is in the range of from 100 to 1,000 nm, and at the same time, a minimum particle diameter (Dmin) and a maximum particle diameter (Dmax) of the metal oxide are 10 nm and 1,300 nm, respectively. If the minimum particle diameter (Dmin) of the metal oxide is less than 10 nm, paste preparation is difficult. On the other hand, if the maximum particle diameter (Dmax) of the metal oxide exceeds 1,300 nm, electron emission and hole injection is difficult and an arc discharge can be induced.

The content of the metal oxide is preferably in the range of from 5 to 100 parts by weight, more preferably from 10 to 60 parts by weight, based on 1 part by weight of the carbon-based material.

The presence of the metal oxide in the electron emission source-forming composition enables sintering in an air atmosphere, thereby efficiently preventing the degradation of the carbon-based material, such as CNTs.

The present invention also provides an electron emission source-forming composition consisting essentially of a carbon-based material, a vehicle, and a Pb free frit.

In this aspect of the present invention, the content of the Pb free frit is preferably in the range of from 0.25 to 10 parts by weight based on 1 part by weight of the carbon-based material. If the content of the Pb free frit is less than 0.25 parts by weight, adhesion of an electron emission source is lowered. On the other hand, if it exceeds 10 parts by weight, electron emission characteristics are lowered.

The carbon-based material used herein has excellent conductivity and electron emission characteristics, and serves to emit electrons toward a phosphor layer of an anode plate to excite phosphors of the phosphor layer during electron emission device operation. Non-limiting examples of the carbon-based material include carbon nano-tubes, graphite, diamonds, fullerene, and silicon carbide. Carbon nano-tubes are most preferable.

The vehicle contained in the electron emission source-forming composition of the present invention is used to adjust the printability and viscosity of the electron emission source-forming composition. The vehicle is composed of a resin component and a solvent component. The resin component is preferably at least one resin selected from cellulosic resins, such as ethyl cellulose and nitro cellulose, acrylic resins, such as polyester acrylate, epoxy acrylate, and urethane acrylate, and vinyl resins, such as polyvinyl acetate, polyvinyl butyral, and polyvinyl ether, but is not limited thereto. Some of these resin components can also serve as photoresist resins.

The solvent component is preferably at least one solvent selected from terpineol, Butyl Carbitol (BC), Butyl Carbitol Acetate (BCA), toluene, and texanol. Terpineol is preferable.

The content of the resin component is preferably in the range of from 1 to 5 parts by weight, more preferably from 2 to 3 parts by weight, based on 1 part by weight of the carbon-based material.

The content of the solvent component is preferably in the range of from 5 to 15 parts by weight, preferably 8 to 12 parts by weight, based on 1 part by weight of the carbon-based material. If the contents of the resin component and the solvent component constituting the vehicle are outside the above ranges, the printability and flowability of the electron emission source-forming composition are lowered. In particular, if the contents of the resin component and the solvent component constituting the vehicle exceeds 15 parts by weight, drying is excessively retarded.

The electron emission source-forming composition of the present invention can further include at least one component selected from a photoresist resin, a photoinitiator, and a filler, when needed.

The photoresist resin that can be used herein is a material used for patterning electron emission sources. Non-limiting examples of the photoresist resin include an acrylate-based monomer, a benzophenone-based monomer, an acetophenone-based monomer, and a thioxanthone-based monomer. More specifically, the photoresist resin can be epoxy acrylate, polyester acrylate, 2,4-diethyloxanthone, or 2,2-dimethoxy-2-phenylacetophenone. The content of the photoresist resin can be in the range of from 3 to 10 parts by weight, preferably from 5 to 8 parts by weight, based on 1 part by weight of the carbon-based material. If the content of the photoresist resin is less than 3 parts by weight, exposure sensitivity is lowered. On the other hand, if it exceeds 10 parts by weight, developing is poor.

The photoinitiator is used to initiate the cross-linking reaction of the photoresist resin upon exposure. The photoinitiator can be benzophenone but is not limited thereto. The content of the photoinitiator can be in the range of from 3 to 10 parts by weight, preferably from 5 to 8 parts by weight, based on 1 part by weight of the carbon-based material. If the content of the photoinitiator is less than 3 parts by weight, patterning is poor due to inefficient cross-linking reaction. On the other hand, if it exceeds 10 parts by weight, manufacturing costs are increased.

The filler is a material used to enhance the conductivity of nano-sized inorganic
materials that are insufficiently attached to a substrate. The filler can be Ag or Al, but it not limited thereto.

Hereinafter, a method of forming an electron emission source using the above-described electron emission source-forming composition are described in detail.

First, an electron emission source-forming composition is prepared according to the above-described components and their contents. The electron emission source-forming composition is as described above and thus a detailed description thereof has been omitted.

Next, the electron emission source-forming composition is printed on a substrate. As used herein, the term "substrate" refers to a substrate intended for formation of an electron emission source. The type of the substrate can be changed according to a desired electron emission device, which is within the knowledge of persons of ordinary skill in the art. For example, in the fabrication of an electron emission device including a gate electrode between a cathode and an anode, the substrate can be the cathode. In the fabrication of an electron emission device including a gate electrode at a lower side of a cathode, the substrate can be an insulating layer insulating the cathode and the gate electrode.

The operation of printing the electron emission source-forming composition is differentially performed according to the presence or absence of a photoresist resin. When the electron emission source-forming composition includes a photoresist resin, a separate photoresist pattern is not required. That is, the electron emission source-forming composition is coated on a substrate followed by exposure and developing according to desired electron emission source areas.

On the other hand, when no photoresist resin is contained in the electron emission source-forming composition, a photolithography process using a separate photoresist pattern is required. That is, a photoresist film is formed on the substrate and patterned to form a photoresist pattern, and then the electron emission source-forming composition is printed on the substrate on which the photoresist pattern has been formed.

The printed electron emission source-forming composition is sintered in an oxygen gas atmosphere or a nitrogen gas atmosphere containing 1,000 ppm or less of oxygen, in particular 10 to 500 ppm of oxygen. Through the sintering in an oxygen gas atmosphere, a carbon-based material contained in the electron emission source-forming composition is efficiently adhered to the substrate, a vehicle is removed by evaporation, and the other materials such as an inorganic binder are melted and then solidified, thereby enhancing the durability of an electron emission source.

The sintering temperature is determined according to the evaporation temperature and time of the vehicle contained in the electron emission source-forming composition. Generally, the sintering temperature is in the range of from 350 to 500° C., preferably 450° C. If the sintering temperature is less than 350° C., vehicle evaporation is insufficient. On the other hand, if it exceeds 500° C., manufacturing costs are increased and the substrate can be damaged.

The resultant sintered product can be activated when needed. The activation can be performed by coating the resultant sintered product with a solution capable of being cured as a film by heating, e.g., a polyimide polymer-containing surface treatment agent, followed by heating and delamination of a film formed by the heating. Alternatively, the activation can also be performed by forming an adhesive portion on a surface of a roller driven by a driving source and pressing the resultant sintered product with the roller under a predetermined pressure. Through the activation, nano-sized inorganic materials can be exposed on surfaces of electron emission sources or vertically aligned.

An electron emission source formed according to the above-described method includes a carbon-based material and at least one metal oxide with an average particle diameter of from 10 to 1,000 nm selected from $Al_2O_3$, $TiO_2$, and $SiO_2$. In some cases, the electron emission source can further include a Pb free frit.

An electron emission source of the present invention can also consist essentially of a carbon-based material and a Pb free frit.

According to the present invention, a carbon-containing organic compound in an electron emission source-forming composition is more efficiently thermally decomposed through sintering in the presence of an oxygen gas, resulting in a remarkable reduction in the content of carbon deposited in an electron emission source after the sintering.

Such an electron emission source of the present invention has a current density of from 400 to 1,100 $\mu A/cm^2$ at 5V/$\mu$m, more preferably 600 to 1,100 $\mu A/cm^2$. An electron emission source with such a current density is suitable for a display device or an electron emission device used as a backlight unit.

An example of an electron emission device including an electron emission source as described above is illustrated in FIG. 1.

FIG. 1 is a view of an electron emission device having a triode structure according to an embodiment of the present invention. Referring to FIG. 1, an electron emission device 200 includes an upper plate 201 and a lower plate 202. The upper plate 201 includes an upper substrate 190, an anode 180 disposed on a lower surface 190a of the upper substrate 190, and a phosphor layer 170 disposed on a lower surface 180a of the anode 180.

The lower plate 202 includes a lower substrate 110 parallel with and separated from the upper substrate 190 to define an internal space; a cathode 120 disposed in a stripe pattern on the lower substrate 110; a gate electrode 140 disposed in a stripe pattern to intersect with the cathode 120; an insulating layer 130 interposed between the gate electrode 140 and the cathode 120; an electron emission hole 169 defined by the insulating layer 130 and the gate electrode 140; and an electron emission source 160 disposed at a lower height than the gate electrode 140 in the electron emission hole 169 and electrically connected to the cathode 120. The electron emission source 160 is as described above and thus a detailed description thereof has been omitted.

The upper plate 201 and the lower plate 202 are maintained at a lower vacuum pressure than atmospheric pressure. A spacer 192 is disposed between the upper plate 201 and the lower plate 202 to support the upper plate 201 and the lower plate 202 and define an emission space 210.

A high voltage necessary for acceleration of electrons emitted from the electron emission source 160 is supplied to the anode 180 so that the electrons can collide with the phosphor layer 170 at high speeds. Phosphors of the phosphor layer 170, when excited by the electrons, emit visible light when falling from a high energy level to a low energy level.

The gate electrode 140 is responsible for easy emission of electrons from the electron emission source 160. The insulating layer 130 defines the electron emission hole 169 and serves to insulate the electron emission source 160 and the gate electrode 140.

Even though an electron emission device having a triode structure as shown in FIG. 1 has been illustrated hitherto, electron emission devices having a diode structure, etc., in addition to a triode structure, are also within the scope of the present invention. Furthermore, the present invention can also be applied in electron emission devices in which a gate electrode is disposed on a lower surface of a cathode and electron emission devices having a grid/mesh structure to prevent damage of a gate electrode and/or a cathode by arcing that is assumed to be generated by a discharge phenomenon and to focus electrons emitted from an electron emission source. Of course, the structures of the above electron emission devices can also be applied to display devices.

Hereinafter, the present invention will be described more specifically by examples. However, the following examples are provided only for illustration and the present invention is not limited to or by them.

PREPARATION EXAMPLE 1

1 g of CNT powders (MWNT, Iljin Nanotech, Korea), 10 g of $Al_2O_3$ (particle diameter: 500 nm), 5 g of polyester acrylate, and 5 g of benzophenone were added to 10 g of terpineol and stirred to prepare an electron emission source-forming composition.

PREPARATION EXAMPLE 2

An electron emission source-forming composition was prepared in the same manner as in Preparation Example 1 except that $TiO_2$ was used instead of $Al_2O_3$.

PREPARATION EXAMPLE 3

An electron emission source-forming composition was prepared in the same manner as in Preparation Example 1 except that SnO—$P_2O_5$ frit was used instead of 10 g of $Al_2O_3$.

COMPARATIVE PREPARATION EXAMPLE 1

An electron emission source-forming composition was prepared in the same manner as in Preparation Example 1 except that PbO as a Pb-containing frit was used instead of $Al_2O_3$.

1 g of each composition prepared in Preparation Examples 1-3 and Comparative Preparation Example 1 was taken to prepare a sample. Each sample was primarily sintered at 450° C. in a nitrogen gas atmosphere for 5 hours, and then secondarily sintered at 450° C. in an air atmosphere. Electron emission amounts after the primary sintering and the secondary sintering were measured. A difference in the electron emission amounts after the primary sintering and the secondary sintering, represented by residual amount (%), is presented in Table 1 below.

TABLE 1

| Sample | Electron Emission Amount ($\mu A/cm^2$ @ 5 V/$\mu$m) | | |
| --- | --- | --- | --- |
| | Primary sintering | Secondary sintering | Residual amount (%) |
| Preparation Example 1 | 500 | 493 | 98.6 |
| Preparation Example 2 | 389 | 422 | 108 |
| Preparation Example 3 | 808 | 331 | 41 |
| Comparative Preparation Example 1 | 416 | 0 | 0 |

As can be seen from Table 1, in connection with Comparative Preparation Example 1, an electron emission amount after secondary sintering was remarkably reduced. On the contrary, in connection with Preparation Examples 1-3, an electron emission amount was satisfactorily retained even after secondary sintering.

To determine an addition effect of $Al_2O_3$ and Pb free frit used for preparation of the electron emission source-forming compositions, the following experiments were performed.

Test 1

Figure 2:
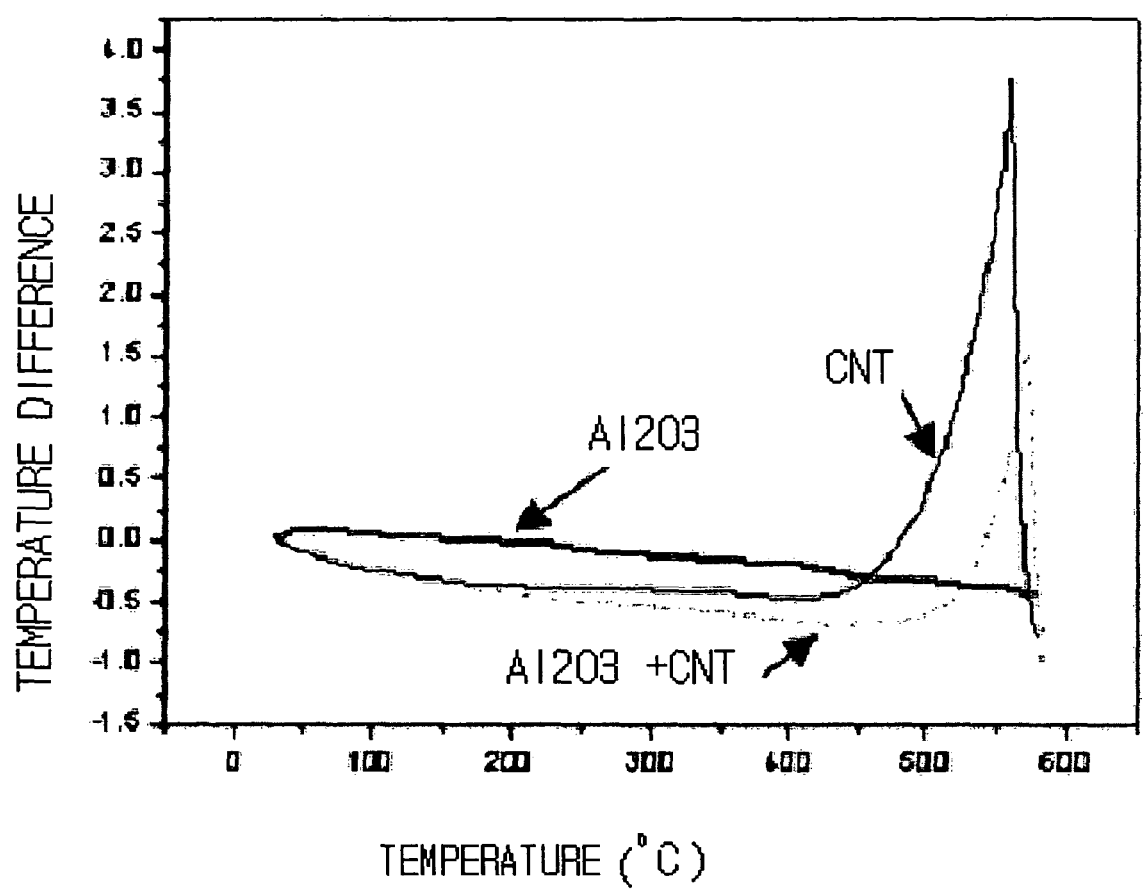
FIGS. 2 through 4 are views of Differential Thermal Analysis (DTA) results for $Al_2O_3$, lead free frit, and lead-containing frit used to prepare electron emission source-forming compositions according to Preparation Examples 1 and 3 of the present invention and Comparative Preparation Example 1.

Differential Thermal Analysis (DTA) for three samples, i.e., CNTs, a mixture of CNTs with $Al_2O_3$, and $Al_2O_3$ was performed and the analysis results are shown in FIG. 2.

Test 2

Figure 3:
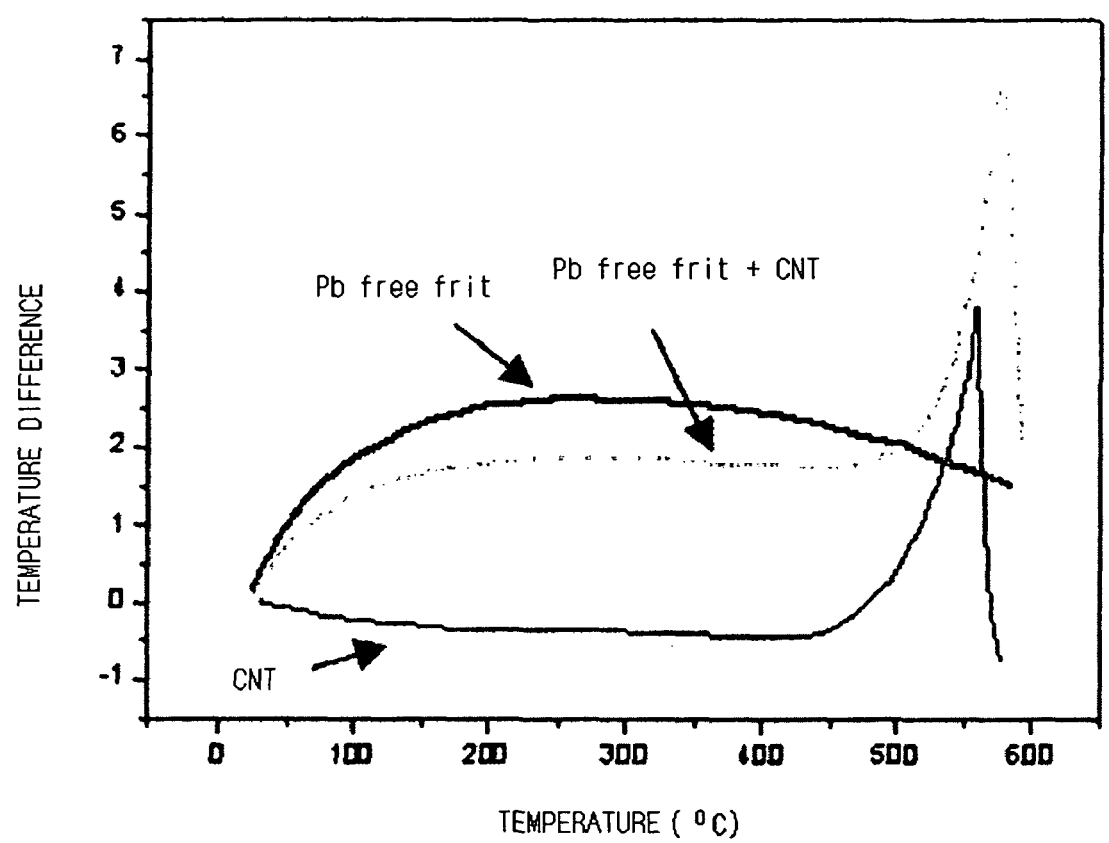

DTA for three samples, i.e., CNTs, a mixture of CNTs with Pb free frit, and Pb free frit was performed and the analysis results are shown in FIG. 3.

Test 3

Figure 4:
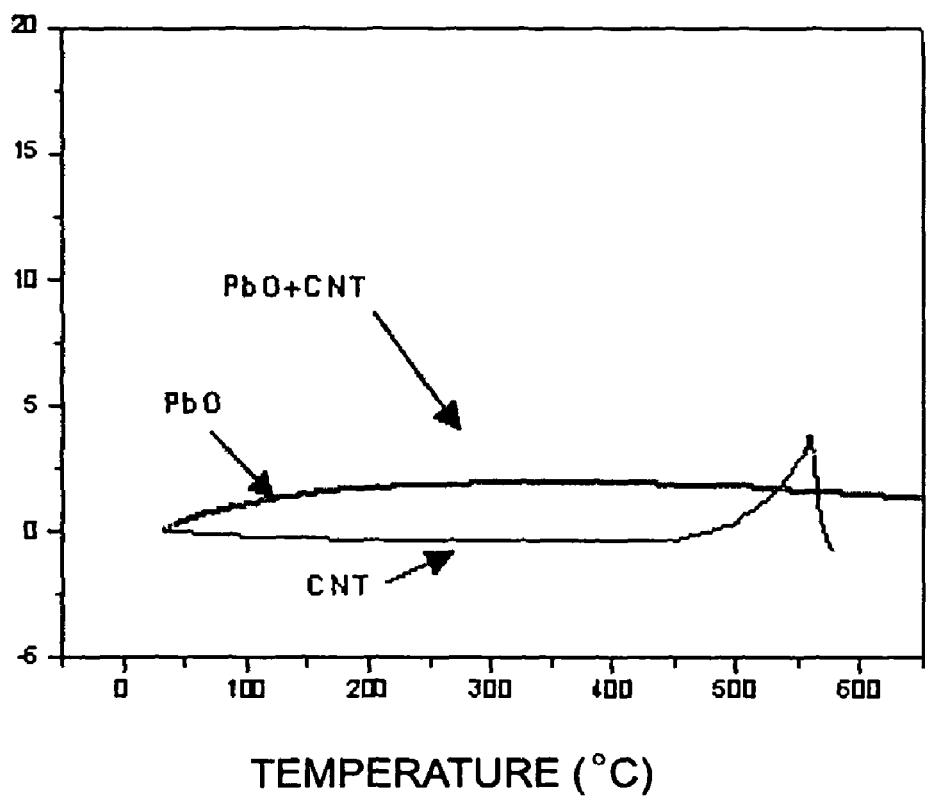

DTA for three samples, i.e., CNTs, a mixture of CNTs with PbO as a Pb-containing frit, and PbO was performed and the analysis results are shown in FIG. 4.

Referring to FIG. 4, DTA for the Pb-containing frit facilitating CNT degradation showed an exothermic peak at a lower temperature, relative to DTA for CNT. Referring to FIGS. 2 and 3, DTA for $Al_2O_3$ and Pb free frit showed an exothermic peak at a higher temperature relative to DTA for CNT. From these DTA results, it can be seen that $Al_2O_3$ and Pb free frit efficiently prevent degradation of CNTs.

EXAMPLE 1

The electron emission source-forming composition prepared in Preparation Example 1 was printed on electron emission source areas of a substrate including thereon a Cr gate electrode, an insulating layer, and an ITO electrode and then exposed to light using a pattern mask and parallel exposure equipment with an exposure energy of 2,000 mJ/cm². The resultant structure after the exposure was developed with acetone and sintered at 450° C. in a mixed gas of oxygen and nitrogen (oxygen concentration: about 1,000 ppm) to thereby form electron emission sources.

Then, a substrate including thereon a phosphor layer and an anode made of ITO was disposed to face with the substrate including thereon the electron emission sources and spacers maintaining a cell gap between the two substrates were then formed between the two substrates to thereby complete an electron emission device.

EXAMPLES 2 and 3

Electron emission devices were manufactured in the same manner as in Example 1 using the electron emission source-forming compositions prepared in Preparation Examples 2 and 3 instead of the electron emission source-forming composition prepared in Preparation Example 1.

COMPARATIVE EXAMPLE 1

An electron emission device was manufactured in the same manner as in Example 1 using the electron emission source-forming composition prepared in Comparative Preparation Example 1 instead of the electron emission source-forming composition prepared in Preparation Example 1.

The current densities of the electron emission devices manufactured in Examples 1-3 and Comparative Example 1 were measured using a pulse power source and an ammeter.

According to the current density measurements, the electron emission devices of Examples 1-3 exhibited enhanced current density characteristics and thus enhanced electron emission characteristics, as compared to the electron emission device of Comparative Example 1.

An electron emission source-forming composition according to the present invention can be sintered under an air atmosphere during electron emission source formation. Therefore, carbon deposits after sintering and degradation of CNTs upon sintering can be remarkably reduced, thereby resulting in formation of an electron emission source with a high current density, unlike in a conventional electron emission source formation method. The use of an electron emission source thus formed enables fabrication of an electron emission device with enhanced reliability.

What is claimed is:

1. An electron emission source, comprising:
    a carbon-based material; and
    at least one metal oxide with an average particle diameter in a range of from 100 to 1,000 nm selected from $Al_2O_3$, $TiO_2$, and $SiO_2$; and
    the content of the metal oxide is in a range of from 10 to 60 parts by weight based on 1 part by weight of the carbon-based material.

2. The electron emission source of claim 1, further comprising a lead (Pb) free frit in a range of from 0.25 to 10 parts by weight based on 1 part by weight of the carbon-based material.

3. The electron emission source of claim 2, wherein the Pb free fit is tin oxide-phosphorus pentaoxide ($SnO$—$P_2O_5$).

4. An electron emission source, comprising:
    a carbon-based material and a Pb free frit comprised of $SnO$—$P_2O_5$, forming an electron emitting source.

5. The electron emission source of claim 4, wherein the content of the Pb free frit is in a range of from 0.25 to 10 parts by weight based on 1 part by weight of the carbon-based material.

6. An electron emission device, comprising:
    a first substrate and a second substrate disposed to face with each other;
    a cathode formed on the first substrate;
    an electron emission source, including a carbon-based material and at least one metal oxide with an average particle diameter in a range of from 100 to 1,000 nm selected from $Al_2O_3$, $TiO_2$, and $SiO_2$ electrically connected to the cathode formed on the first substrate, wherein the content of the metal oxide is in a range of from 10 to 60 parts by weight based on 1 part by weight of the carbon-based material;
    an anode formed on the second substrate; and
    a phosphor layer emitting light by electrons emitted from the electron emission source.

7. An electron emission device, comprising:
    a first substrate and a second substrate disposed to face with each other;
    a cathode formed on the first substrate;
    an electron emission source, including a carbon-based material and at least one metal oxide with an average particle diameter in a range of from 100 to 1,000 nm selected from $Al_2O_3$, $TiO_2$, and $SiO_2$, and wherein the content of the metal oxide is in a range of from 10 to 60 parts by weight based on 1 part by weight of the carbon-based material, electrically connected to the cathode formed on the first substrate:
    an anode formed on the second substrate; and
    a phosphor layer emitting light by electrons emitted from the electron emission source.

8. An electron emission device, comprising:
    a first substrate and a second substrate disposed to face with each other;
    a cathode formed on the first substrate;
    an electron emission source, including a carbon-based material and a Pb free frit, electrically connected to the cathode formed on the first substrate, wherein the Pb free frit is $SnO$—$P_2O_5$;
    an anode formed on the second substrate; and a phosphor layer emitting light by electrons emitted from the electron emission source.

9. An electron emission device, comprising:
a first substrate and a second substrate disposed to face with each other;
a cathode formed on the first substrate;
an electron emission source, including a carbon-based material and a Pb free frit, wherein the content of the Pb free frit is in a range of from 0.25 to 10 parts by weight based on 1 part by weight of the carbon-based material, electrically connected to the cathode formed on the first substrate;
an anode formed on the second substrate; and
a phosphor layer emitting light by electrons emitted from the electron emission source.

10. An electron emission source-forming composition, comprising:
a carbon-based material;
a vehicle composed of a resin component and a solvent component; and
at least one metal oxide with an average particle diameter in a range of from 100 to 1,000 nm selected from $Al_2O_3$, $TiO_2$, and $SiO_2$, wherein
the content of the metal oxide is in a range of from 10 to 60 parts by weight based on 1 part by weight of the carbon-based material.

11. The composition of claim 10, wherein the particle diameter of the metal oxide is adjusted so that a difference between a particle diameter (D10) with 10 wt % particle-size distribution and a particle diameter (D90) with 90% particle-size distribution is 300 nm or less.

12. The composition of claim 10, further comprising a Pb free frit in a range of from 0.25 to 10 parts by weight based on 1 part by weight of the carbon-based material.

13. The composition of claim 12, wherein the Pb free frit is $SnO$—$P_2O_5$.

14. An electron emission source-forming composition, comprising:
a carbon-based material;
a vehicle composed of a resin component and a solvent component; and
a Pb free frit comprising $SnO$—$P_2O_5$.

15. The composition of claim 14, wherein the content of the Pb free frit is in a range of from 0.25 to 10 parts by weight based on 1 part by weight of the carbon-based material.

* * * * *